United States Patent [19]

Nilsson

[11] Patent Number: 4,508,288

[45] Date of Patent: Apr. 2, 1985

[54] WINDING ATTACHMENT FOR BELTS

[75] Inventor: Karl E. Nilsson, Ottobrunn, Fed. Rep. of Germany

[73] Assignee: Bayern-Chemie Gesellschaft für Flugchemische Antriebe mit beschränkter Haftung, Fed. Rep. of Germany

[21] Appl. No.: 489,078

[22] Filed: Apr. 27, 1983

[30] Foreign Application Priority Data

Apr. 29, 1982 [DE] Fed. Rep. of Germany ....... 3215928

[51] Int. Cl.³ .................. A62B 35/02; B65H 75/48
[52] U.S. Cl. ................ 242/107; 245/107.4 R; 280/806
[58] Field of Search .......... 242/107.4 R-107.4 E, 242/107; 280/806; 297/478, 480

[56] References Cited

U.S. PATENT DOCUMENTS 4,014,479  3/1977  Nilsson ................ 242/107.4 A
4,423,846  1/1984  Fohl .................... 242/107

FOREIGN PATENT DOCUMENTS 2262889  4/1974  Fed. Rep. of Germany.

Primary Examiner—John M. Jillions
Attorney, Agent, or Firm—McGlew and Tuttle

[57] ABSTRACT

A winding attachment for passenger seat belts for use with a windable takeup roller over which the seat belt is wound and which includes a takeup roller shaft and a rotatable clutch disc which is connected to the shaft when the disc is rotated in a shaft tightening direction comprises a rotatable cylinder with a hollow cylindrical piston shaft relatively rotatable within the cylinder. The cylinder has a cylinder wing which is rotatable therewith and which is located within the cylinder and the piston shaft has a wing connected to it which rotates within the cylinder in a path which intersects the path of rotation of the cylinder wing. Propellant contained within the hollow cylinder is ignited and it produces propellant gases which expand in the cylinder against the cylinder wing in the piston shaft wing to produce relative rotation of the cylinder and piston shaft for a period of time until the wings meet causing the stopping of the rotation. A tension member is connected to one of the cylinder or piston shafts and to the clutch disc and during the time in which the cylinder and the piston shaft rotate relatively it drives the disc in a direction to cause tightening of the belt on the takeup roller.

6 Claims, 11 Drawing Figures

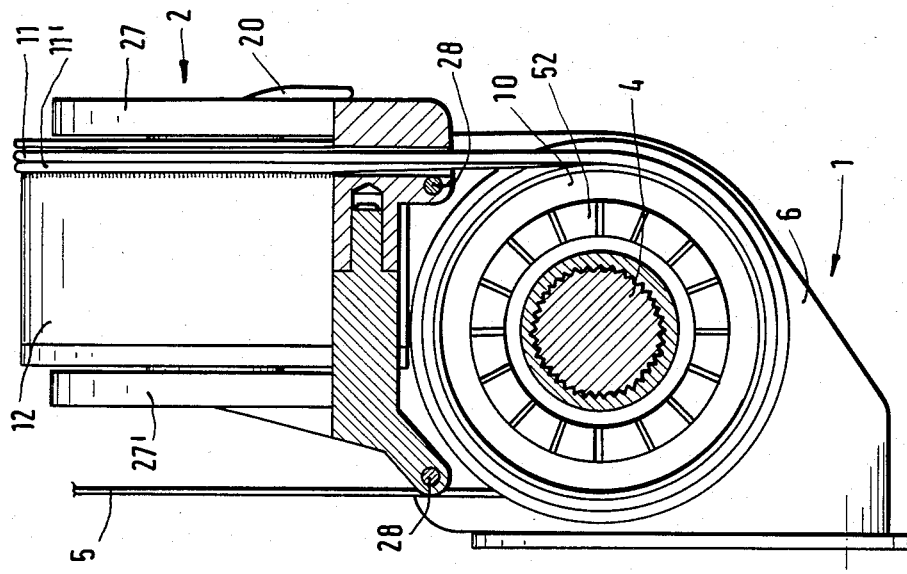
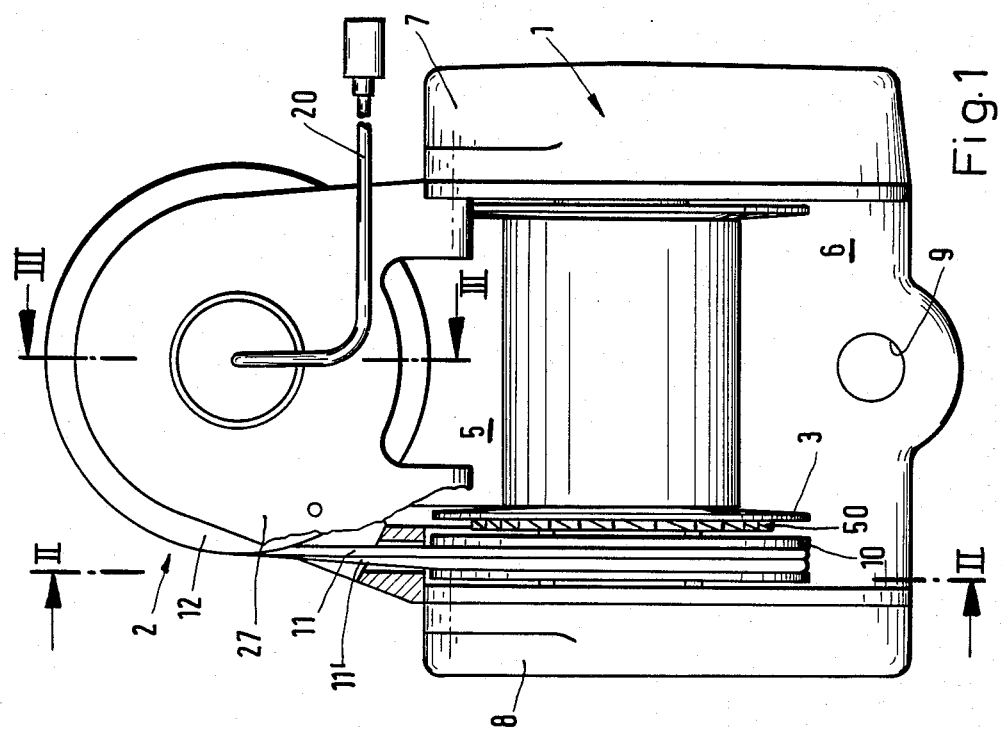

WINDING ATTACHMENT FOR BELTS

FIELD AND BACKGROUND OF THE INVENTION

This invention relates in general to passenger seat belt devices and in particular to a new and useful winding attachment for passenger safety belts in vehicles which produce a retightening of the belt during emergency conditions.

Retighteners serve to eliminate a slack in the belt in a collision by retracting the belt so that the free prolapse path or period until the belt becomes effective is as small as possible. Orderly belt retightening requires a belt retraction of about 20 cm. This corresponds to a rotation of the belt strap stool of about 550°. (DE-AS No. 25 10 514).

In DE-AS No. 25 10 514, which corresponds to U.S. Pat. No. 4,014,479, two rotating wings are arranged axially side by side on a rotary piston shaft of a rotary piston engine, where a wing fixed on the case is assigned to the first rotating wing on the rotary piston shaft, forming a first expansion chamber, while a rotating wing arranged non-rotationally on a rotating jacket is assigned to the second rotating wing on the rotary piston shaft, forming a second expansion chamber. The driver clutch over which the rotary piston engine drives the belt strap spool is formed by a plurality of circumferential bores in the side disc of the belt strap spool facing the rotary piston engine, into which can be inserted a bolt admitted by the propellant gases, which is arranged on the jacket provided with the rotating wing. The belt strap spool is to this end rotatably mounted on a journal fixed in the case. For blocking the automatic takeup roller, the side disc of the belt strap spool facing the rotary piston engine is designed as a ratchet wheel, which cooperates with a ratchet. The gases entering the two expansion chambers cause then a rotation of the rotating wing of the rotary piston shaft, which cooperates with the fixed wing. It also causes a rotation of the second rotating wing of the rotary piston shaft, which cooperates with the rotating wing on the jacket. At the same time the expansion chamber widens between the second rotating wing of the rotary piston shaft and the rotating wing on the jacket, so that the latter imparts almost two revolutions to the belt strap stool.

A disadvantage of the known winding attachment is, however, that due to the numerous differences of the automatic takeup roller relative to the existing series-produced, that is, technically refined automatic takeup roller, which is relatively inexpensive due to its larger quantities, subsequent attachment of the belt tighteners on the latter is not possible.

Beyond that the pressure of the propellant gases acts during the expansion also on the rotary piston shaft, so that the latter is loaded radially away from the expansion chamber enclosing the propellant gases. This radial load requires a solid design of the rotary piston shaft and an elaborate support.

SUMMARY OF THE INVENTION

The invention solves the problem of providing a winding attachment which uses a retightener with a simple rotary piston engine to eliminate a sufficiently large slack in the belt, where the retightener can be attached in a series production on the standard automatic takeup roller without any, or at any rate with only minor modifications.

Due to the axially symmetrical arrangement of several rotating wings according to the invention on the rotary shaft, radial forces acting on the latter are compensated. Consequently a stronger propellant charge can be used, and the rotary piston shaft need not be excessively solid. In particular, the support of the rotary piston shaft in the case can be simplified. Furthermore, the moment of rotation which the propellant gases impart to the rotary piston shaft or the rotating cylinders can be multiplied, corresponding to the number of rotating wings. Once the moment of rotation has been displayed, which is due to the freewheel clutch in the rotating masses of the automatic takeup roller, and of the retightener, it can be used practically completely for the retraction of the belt.

In one embodiment of the invention the rotating cylinder drives the belt strap spool alone until the freewheel clutch disengages between the rotary piston shaft and the case of the rotary piston engine. This construction is of particular advantage, because the rotating cylinder has a greater flywheel mass than the rotary piston, so that, when the propellant gases are admitted a greater centrifugal energy can be stored in the rotating cylinder than in the rotary pistons. Besides, in the reverse case, when the rotary piston shaft drives first the belt strap spool, an additional driving disc would be required on the rotary piston shaft.

Accordingly it is an object of the invention to provide a winding attachment for seat belts which includes a rotary element which is driven by a pyrotechnic propellant charge to cause a temporary retightening of a seat belt when the charge is ignited.

A further object of the invention is to provide a winding attachment for passenger seat belts for use with a windable takeup roller over which the seat belt is wound which includes a takeup roller shaft of a clutch disc connected thereto for winding the shaft in a tightening direction when the disc is driven by a winding attachment wherein the winding attachment includes a rotatable cylinder with a rotatable piston mounted therein having a wing which moves within the cylinder space and which includes a pyrotechnic charge which is ignited to generate propellant gases which act on the wings to cause them to rotate until the two wings meet and which further includes a coupling element for example in the form of the tensioning cord which is connected to the disc of the takeup roller so as to drive the disc in a direction in which the retightening can take place. The clutch disc is advantageously such that it will drive when rotated in a single direction to permit the takeup roller to operate normally at other times.

A further object of the invention is to provide a winding attachment for passenger seat belts which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a front elevational view of a combined takeup roller and retightening device constructed in accordance with the invention;

FIG. 2 is a section taken along the line II—II of FIG. 1;

DESCRIPTION OF THE PREFERRED EMBODIMENTS

Figure 3:
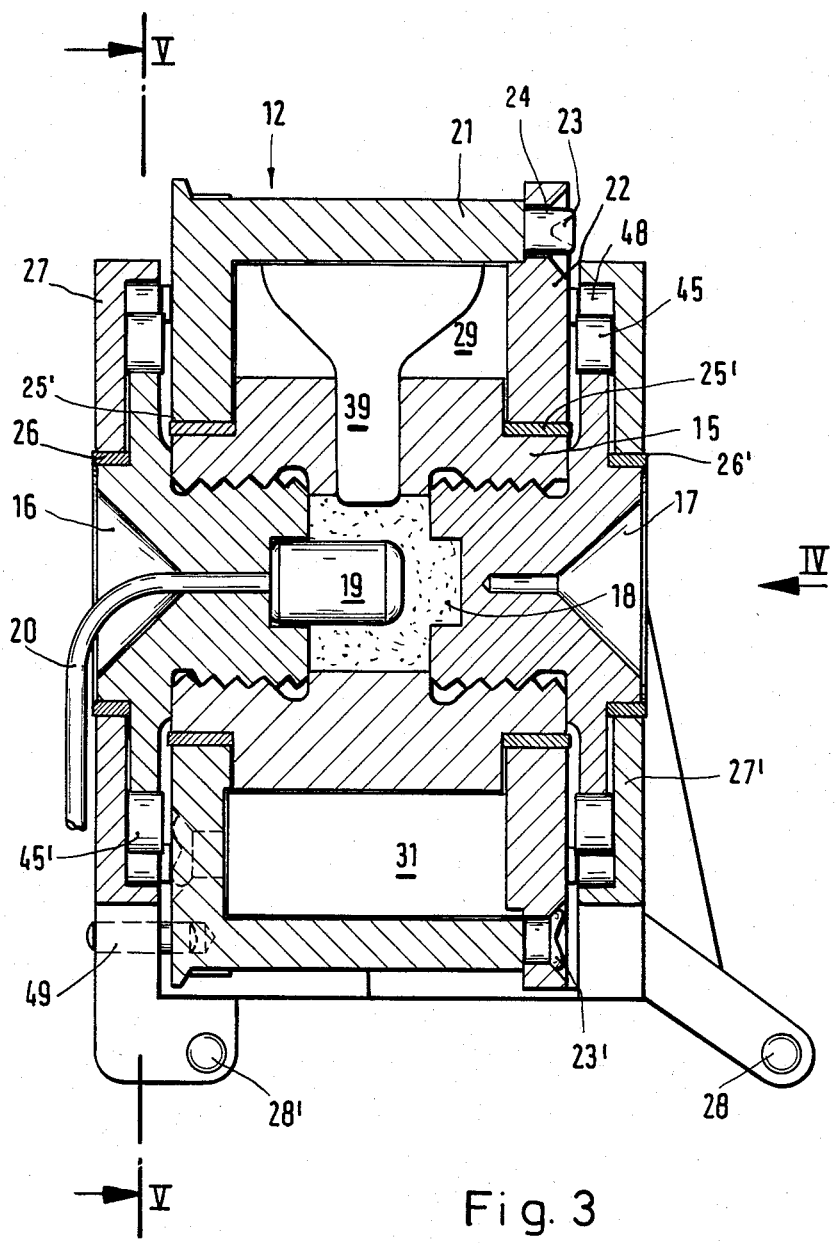
FIG. 3 is a section taken along the lines III—III of FIG. 1.
Figure 4:
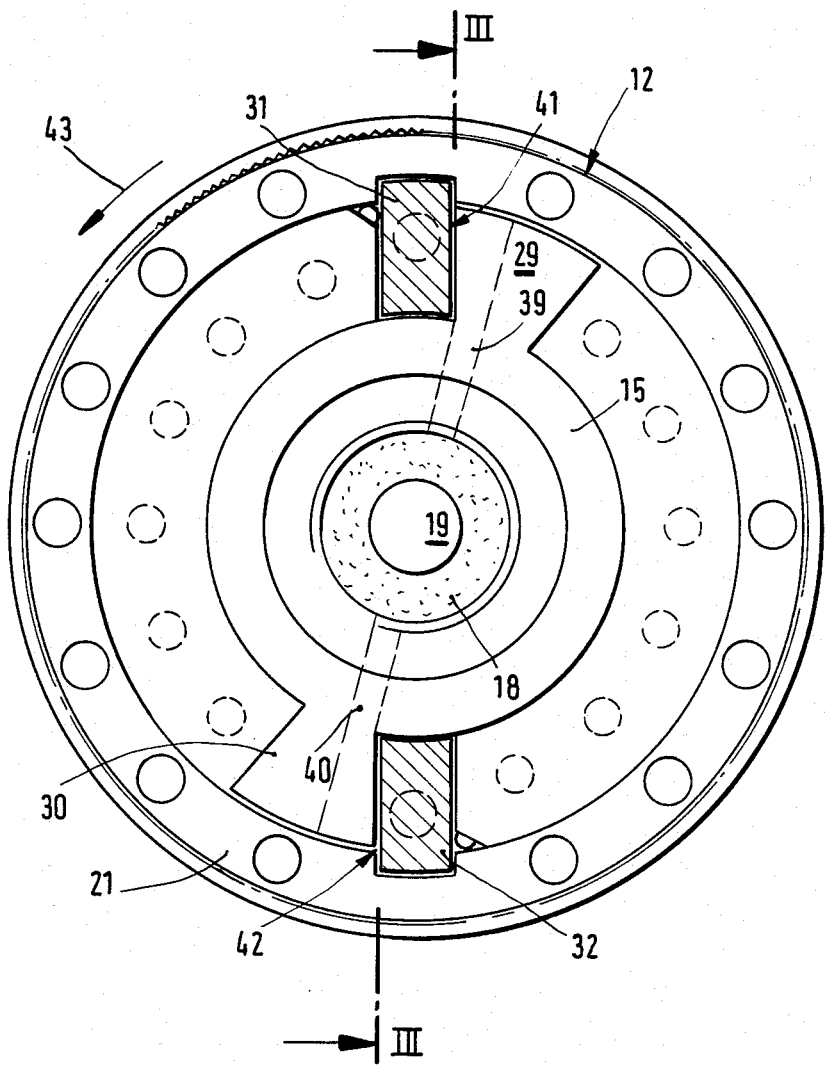
FIG. 4 is a section taken through FIG. 3 in the direction of arrow IV.

Referring to the drawings in particular, the invention embodied therein comprises a winding attachment or retightener 2 for use with a takeup roller for passenger seat belts generally designated 1. Seat belt straps are wound over a belt strap spool 3 which has a shaft 4 which may be driven by clutch means including a clutch disc 10 which is connectable to the shaft 4 when the clutch disc is rotated in a belt tightening direction to drive the shaft to effect the tightening of the belt. The rewinding attachment comprises a rotatable cylinder 12 which as shown in FIG. 3 supports a hollow cylindrical piston shaft 15 which is rotatable within the cylinder. The cylinder 12 carries two diametrically opposite cylinder wings or vanes 31 and 32 as shown in FIG. 4 which are rotatable within the cylinder 12. The piston shaft 15 carries two diametrically opposite piston wings or vanes 29 and 30 which also rotate within the cylinder through a path which intersects the path of the cylinder wings 31 and 32. The space in the cylinder defines expansion chambers 41, 42 into which propellant gases are passed through chambers 39, 40 from the ignition of a propellant charge 18 located within piston shaft 15. When the propellant is admitted to the expansion chamber 41 there is a relative rotation between the rotatable cylinder 12 and the rotatable piston shaft 15. Coupling means in the form of a tension member or cord 11 is connected selectively to either the piston 15 or the cylinder 12 so that it is moved during the rotation thereof. This movement is transferred to the clutch disc 10 to which the tension member 11 is connected. This causes the driving of the disc in the belt takeup shaft of the takeup roller in a direction to cause retightening of the belt. The rotation continues until the cylinder wings and the piston shaft wings meet.

Roller shaft 4 is rotatably mounted in a housing 6 with a plateshaped rear wall. For covering the blocking mechanism and the winding spring of the automatic takeup roller, caps or spring housings 7, 8 are secured on housing 6 at both sides of the belt strap spool 3. The automatic takeup roller 1 is secured on the vehicle by means of a screw in bore 9.

On clutch disc 10 which is arranged on roller shaft 4 and coupled with the belt strap spool 3, is wound preferably several times tension means, which comprises, e.g. two parallel ropes 11, 11'. The two ropes 11, 11' are arranged with about a half loop on the jacket of rotating cylinder 12 of the rotary piston engine of retightener 2 and are secured thereon.

Propellant charge 18 and a fuse 19 are arranged in rotary hollow piston shaft 15 of the rotary piston engine of the retightener 2 according to FIG. 3 and it is sealed by a flange screw 16 and 17 at both ends of rotary piston shaft 15. An ignition wire 20 leads through flange screw 16 to the outside.

Rotating cylinder 12 consists of a pot-shaped part 21 and a ring disc 22. For securing ring disc 22 on the pot-shaped part 21 of rotating cylinder 12, pins 23 are molded on the rim of pot-shaped part 21, which pass through bores 24 of ring disc 22 and are riveted, as shown in FIG. 3 at the bottom by pin 23'.

Rotating cylinder 12 is rotatably mounted on rotary shaft 15 by means of journal bearings 25, 25'. Rotary piston engine 15 is in turn mounted by means of journal bearings 26, 26' in a front and in a rear fastening frame part 27,27'.

Fastening frame parts 27, 27' which form the case of the rotary piston shaft, are secured over fastening bores 28, 28' on housing 6 of the automatic takeup roller 1.

A guide pin 49 is provided between rotating cylinder 12 and fastening frame part 27. Pin 49 is designed as a breaking pin. It keeps the parts of the rotary piston engine together clatter-free under a light initial stress.

As can be seen particularly from FIG. 4, the two rotating wings or vanes 29, 30 are secured on rotary piston shaft 15 at a distance of 180°. Two other rotating wings or vanes 31, 32 are connected to ring disc 22 and are arranged with the same distance in receiving grooves of the pot-shaped part 21 of rotating cylinder 12.

From propellant charge 18 extend through the wall of rotary piston shaft 15 bores 39, 40 into the two rotating wings 29, 30 of rotary piston shaft 15, forming radially widening outlet orifices into each of the two expansion chambers 41 and 42 between rotating wing 29 of rotary piston shaft 15 and rotating wing 31 of rotating cylinder 12, and between the rotating wing 30 of rotary piston shaft 15 and the second rotating wing 32 of rotating cylinder 12.

After the ignition of propellant charge 18, the propellant gases flow through bores 39, 40 into the two expansion chambers 41, 42 enclosed by rotating wings 29 and 31 and 30 and 32 respectively, and expand. Rotating wings 31, 32 of rotating cylinder 12 are set in rotation in the direction of arrow 43 in FIG. 8. Guide pin 49 between rotating cylinder 12 and fastening frame part 27 is broken. Rotating wings 29, 30 of rotary piston shaft 15 remain at first fixed until rotating wings 31, 32 of rotating cylinder 12 reach the position shown in FIG. 10, that is, strike against rotating wings 29, 30 of rotary piston shaft 15.

This fixing of rotary piston shaft 15 is effected by a freewheel or overriding clutch between rotary piston shaft 15 and the case of the first rotary piston engine. According to FIGS. 3 and 5, the freewheel clutch is designed as a radial, internal freewheel clutch between rotary piston shaft 15 and each fastening frame part 27, 27'. To this end a number of wedge-shaped recesses 44 are provided in fastening frame parts 27, 27', which are equipped with grip rollers 45.

Figure 5:
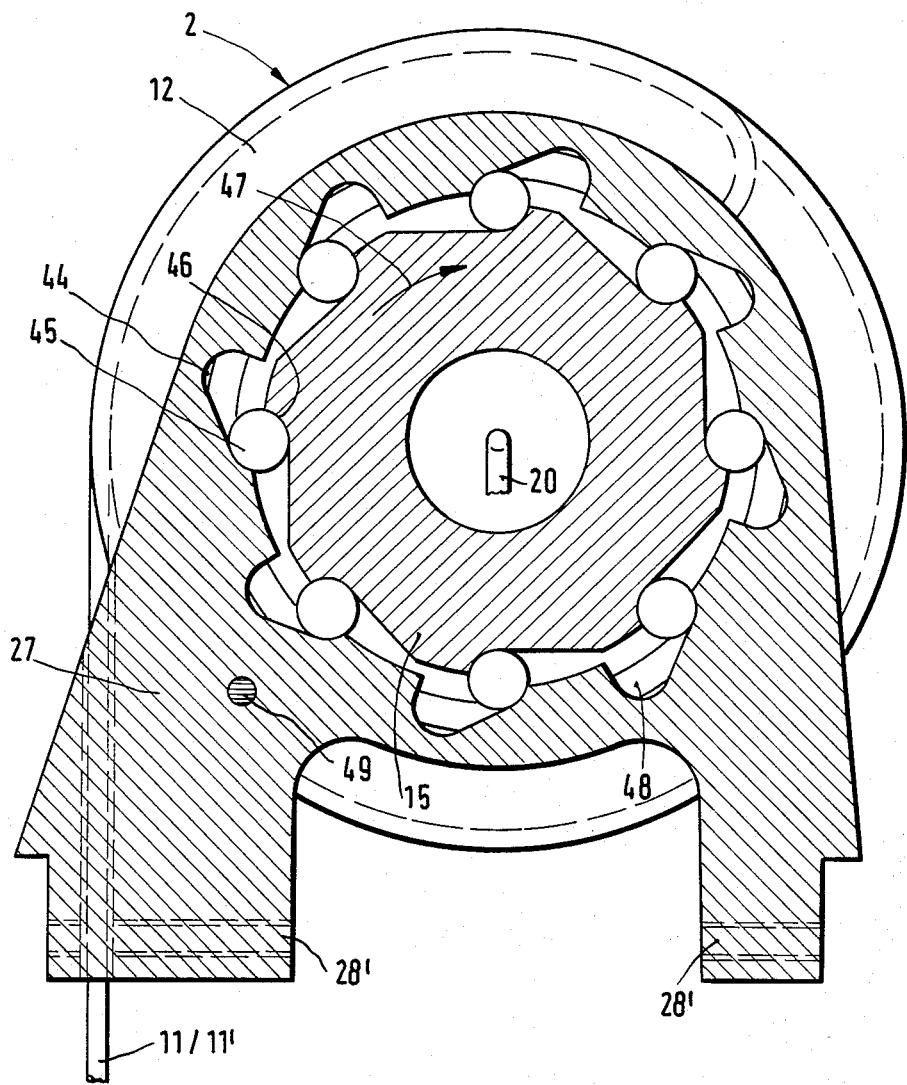
FIG. 5 is a section taken along line V—V of FIG. 3.

In the locked position shown in FIG. 5, that is, when rollers 45 clamp in the wedge-shaped recesses 44, rollers 45 lie in recesses 46, adapted to their diameter, in flange screws 16,17, forming the internal freewheel part. When the freewheel clutch is disengaged, that is, when piston rotary shaft 15 begins to rotate in the direction of arrow 47 of FIG. 5, rollers 45 are moved away from flange screws 16,17 to the outside into the wedge-shaped recesses 44 of fastening frame parts 27, 27', so that rotary piston shaft 15 can turn freely. The above-described freewheel clutch thus represents a directional lock, that is, a lock that locks only in one direction.

Grip rollers 45, which can be made of plastic, are connected over predetermined breaking points with a positioning ring 48, and are thus integral with it.

Figure 10:
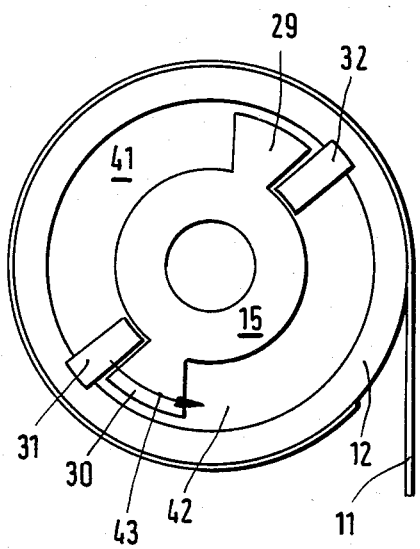
Figure 11:
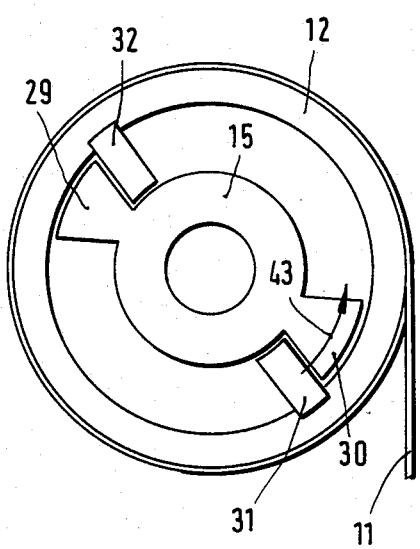

As soon as rotating wings 31,32 strike against rotating wings 29, 30 of rotary piston shaft 15, and have thus reached the rotary position shown in FIG. 10, the feeding of energy through the propellant gases is completed, and rotary piston shaft 15, which has up to then applied forces over grip rollers 45 against fastening frame parts 27, 27', begins to turn, so that grip rollers 45 are forced into the wedge-shaped recesses 44 of fastening frame parts 27, 27'. The overriding is thus completed, that is, rotary piston shaft 15 continues to rotate together with rotating cylinder 12, as shown in FIG. 11, until the centrifugal energy of rotating cylinder 12 and of the rotary piston are transformed into belt tightening energy.

The shock between rotating wings 29, 30 of rotary piston shaft 15 and rotating wings 31, 32 of rotating cylinder 12 should be damped substantially to prevent rotary piston shaft 15 from leading, that is, the rotary piston and rotating cylinder 12 should continue to rotate as a common flywheel mass. This can be ensured by selecting a value for friction between surfaces of rotating cylinder 12 and rotary piston shaft 15 which slide against each other.

Figure 8:
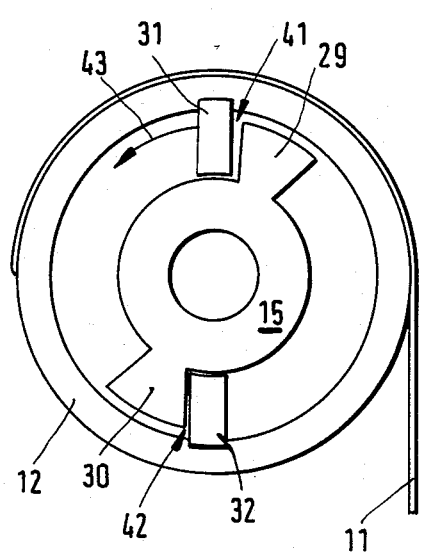
FIG. 8 is a view similar to FIG. 4 on a reduced scale indicating an initial position of the wings of the cylinder and the piston when it is operated to tighten the belt.
Figure 9:
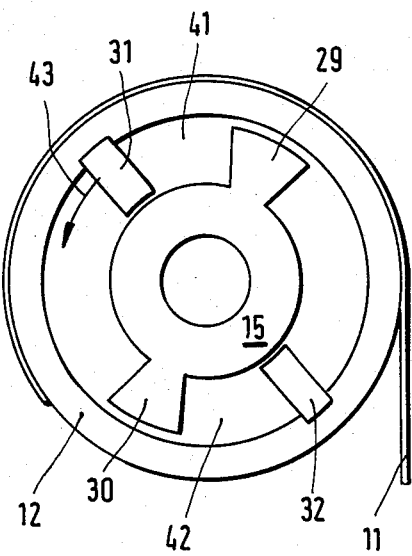
FIGS. 9 to 11 are views similar to FIG. 8 showing advance positions of the parts during the tightening of the belt.

FIGS. 8 to 11 show the sequence of operations in an accident with the mode of operation of the rotary piston and of the rotating cylinder of the rotary piston engine in a schematic representation. FIG. 8 shows the state of rest and the time of ignition respectively, of propellant charge 18. FIG. 9 shows the position of rotating cylinder 12 shortly after the ignition of propellant charge 18, where rotating cylinder 12 rolls up rope 11.

Rotary piston shaft 15 is stopped by grip rollers 45, which bear against fastening frame parts 27, 27'. In FIG. 10, the energy feeding process is completed after an angle of rotation of about 140° of rotating wings 31, 32 of rotating cylinder 12. Rotating wings 31, 32 of rotating cylinder 12 strike then against rotating wings 29, 30 of rotary piston shaft 15. The free wheeling effect then sets in, that is, rotating cylinder 12 and rotary piston shaft 15 continue to rotate, as shown in FIG. 11. The rotation, and thus the belt tightening process are completed when the resistance in belt strap 5 has increased to such an extent that it is no longer possible to take out force from the kinetic energy of the rotating mass. The normal blocking of the automatic takeup roller 1 absorbs the further increasing force in belt strap 5, that is, the crash load.

To insure that clutch disc 10, which is arranged on roller shaft 4, can transmit the moment of rotation imparted to it by the rotating cylinder 12, if necessary, together with the rotary piston over ropes 11, 11' to belt strap spool 3, a driver clutch designed as a freewheel clutch is provided.

Figure 7:
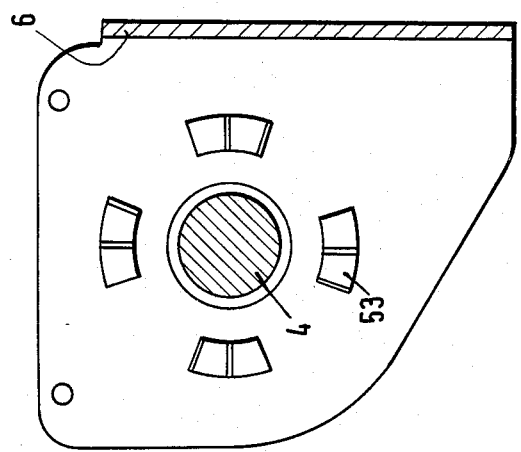
FIG. 7 is a section taken along the lines VII—VII of FIG. 6.
Figure 6:
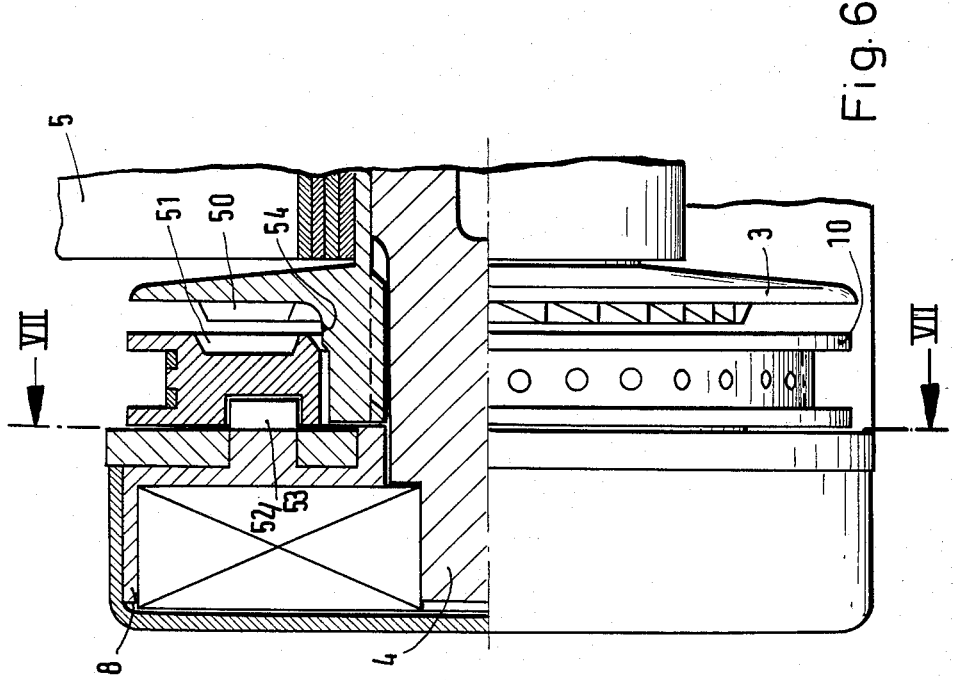
FIG. 6 is a partial sectional view through the takeup roller portion shown in FIG. 1 indicating one embodiment of the driver clutch.

According to FIGS. 6 and 7, clutch disc 10 is axially displaceable on roller shaft 4. Furthermore, a toothing 50 is provided on the end face of belt strap spool 3 facing clutch disc 10, which is opposed by and engageable with a corresponding toothing 51 on clutch disc 10. The tooth crests of toothings 50 and 51 extend in the radial direction. Toothings 50 and 51 have sawtooth profile, that is, each tooth has a vertical and an inclined tooth surface. Clutch disc 10 is secured with a recessed pressure toothing 52 with a slight press fit on a projecting pressure toothing 53 of the spring cassette 8. While pressure toothing 52 on clutch disc 10 is distributed over the entire circumference, pressure toothing 53 on spring cassette 8 consists of four segments with two teeth each.

In the normal operation of the takeup roller 1, clutch disc 10 has no contact with belt strap spool 3 and the roller shaft 4. Only in an accident, when it is set in rotation by ropes 11, 11', does clutch disc 10 move in FIG. 6 axially to the right. This stroke is effected by the meshing surface of the pressure toothing 52, 53 which are shaped to cause this motion. The inner bore of clutch disc 10 runs on centering collar 54 of belt strap spool 3 until the locking toothings 50 and 51 are firmly coupled with each other. Belt strap spool 3 is rigidly connected with roller shaft 4 over a serrated profile (FIG. 2).

While a specific embodiment of the invention has been shown and described in detail to illustrate the application of the principles of the invention, it will be understood that the invention may be embodied otherwise without departing from such principles.

What is claimed is:

1. A winding attachment for passenger seat belts for use with a windable take-up roller over which the seat belt is wound and which includes a roller shaft, and a rotatable clutch disc connected to the roller shaft when the disc is rotated in a belt winding direction, comprising:

a frame;

a piston shaft rotatably mounted to said frame, said piston shaft having a plurality of piston vanes fixed thereto and evenly distributed around said piston shaft;

a cylinder rotatably mounted to said frame and defining a space, said cylinder having a plurality of cylinder vanes fixed thereto and extending into said space, a number of cylinder vanes equalling a number of piston vanes and said piston vanes movable in said space and interleaved between said cylinder vanes, said cylinder vanes being evenly distributed around said cylinder and each defining a chamber with an adjacent piston vane;

a pyrotechnic charge in said piston shaft, with passages defined to each chamber for supplying expanding gas to each chamber with ignition of said pyrotechnic charge; and an overriding clutch connected between said piston shaft and said frame for permitting rotation of said piston shaft on a winding direction only and blocking rotation of said piston shaft in an unwinding direction for the seat belt on the take-up roller whereby upon ignition of said pyrotechnic charge, said cylinder rotates in a winding direction to wind the seat belt on the take-up roller until said cylinder vanes meet said piston vane, and thereafter said piston shaft and said cylinder rotate together in the winding direction so that kinetic energy of the cylinder is provided to the piston shaft.

2. A winding attachment according to claim 1, wherein said overriding clutch comprises an internal clutch member non-rotatably secured to said piston shaft, an external clutch member fixed to said frame and surrounding a circumference of said internal clutch member and a plurality of rollers engaged between said internal and external clutch members for permitting rotation of said piston shaft in one direction and blocking rotation of said piston shaft in an opposite direction.

3. A winding attachment according to claim 2 including at least one safety bolt engaged between said cylinder and said frame, said safety bolt being easily breakable and holding said cylinder in a fixed rotational position with respect to said frame before said bolt is broken.

4. A winding attachment according to claim 3 including a ring connected to each roller at a breakable connection for holding each roller in a position to preclude relative rotation of said piston shaft and frame in one direction, and to be broken away from said ring with rotation of said piston shaft with respect to said frame in an opposite direction.

5. A winding attachment according to claim 4, wherein each piston vane includes a recess defining a passage between said pyrotechnic charge and each chamber.

6. A winding attachment according to claim 5, wherein said piston shaft is rotatably mounted to said cylinder and comprises a central portion rotatably mounted in said cylinder and carrying said piston vanes and pair of outer portions each extending axially out of said space defined by said cylinder and defining said internal clutch member.

* * * * *